(12) United States Patent  
Yang et al.

(10) Patent No.: US 11,960,113 B2  
(45) Date of Patent: Apr. 16, 2024

(54) BACKLIGHT MODULE AND DISPLAY DEVICE

(71) Applicant: HKC CORPORATION LIMITED, Shenzhen (CN)

(72) Inventors: Xiaohui Yang, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/088,752

(22) Filed: Dec. 26, 2022

(65) Prior Publication Data

US 2024/0045135 A1 Feb. 8, 2024

(30) Foreign Application Priority Data

Aug. 2, 2022 (CN) .......................... 202210920404.7

(51) Int. Cl.
*F21V 8/00* (2006.01)
*G02F 1/1335* (2006.01)

(52) U.S. Cl.
CPC ......... *G02B 6/0085* (2013.01); *G02B 6/0088* (2013.01); *G02F 1/133628* (2021.01)

(58) Field of Classification Search
CPC .................. G02B 6/0085; G02F 1/133628
See application file for complete search history.

(56) References Cited

U.S. PATENT DOCUMENTS 10,321,614 B1 * 6/2019 Huang ................... G02F 1/1336
2021/0064100 A1 3/2021 Hwang et al.

FOREIGN PATENT DOCUMENTS

| CN | 2641676 | Y |   | 9/2004 |
|---|---|---|---|---|
| CN | 1760734 | A |   | 4/2006 |
| CN | 101131503 | A |   | 2/2008 |
| CN | 102798105 | A |   | 11/2012 |
| CN | 202647441 | U |   | 1/2013 |
| CN | 204300865 | U |   | 4/2015 |
| CN | 209132549 | U |   | 7/2019 |
| CN | 209327742 | U |   | 8/2019 |
| CN | 212276169 | U |   | 1/2021 |
| CN | 113514986 | A |   | 10/2021 |
| CN | 113741095 | A | * | 12/2021 |
| CN | 215297872 | U |   | 12/2021 |
| CN | 114265243 | A |   | 4/2022 |
| CN | 216217705 | U |   | 4/2022 |
| CN | 114488614 | A |   | 5/2022 |
| CN | 114660851 | A |   | 6/2022 |
| CN | 114660851 | A | * | 6/2022 |
| CN | 114967239 | A |   | 8/2022 |
| CN | 114967240 | A |   | 8/2022 |
| CN | 114994986 | A |   | 9/2022 |

(Continued)

OTHER PUBLICATIONS

Shao, Wenli, the ISA written comments, Apr. 2023, CN.
Shao, Wenli, the International Search Report, Apr. 2023, CN.

*Primary Examiner* — Keith G. Delahoussaye

(57) ABSTRACT

A backlight module and a display device are disclosed. The backlight module includes a back plate, a light plate, and a plurality of lamp beads. The light plate is arranged opposite to the back plate. The plurality of lamp beads are arranged on a side of the light plate facing away from the back plate. The back plate includes a back plate body, at least one sunken groove, and a thermally conductive adhesive.

13 Claims, 5 Drawing Sheets

(56) References Cited

FOREIGN PATENT DOCUMENTS

| | | | |
|---|---|---|---|
| JP | 2002214703 | A | 7/2002 |
| JP | 2009192728 | A | 8/2009 |
| KR | 20070056499 | A * | 6/2007 |

* cited by examiner

BACKLIGHT MODULE AND DISPLAY DEVICE

CROSS-REFERENCE TO RELATED APPLICATIONS

This application claims the priority to and benefit of Chinese patent application CN202210920404.7, titled "Backlight Module and Display Device" and filed Aug. 2, 2022 with China National Intellectual Property Administration, the entire contents of which are incorporated herein by reference.

TECHNICAL FIELD

The present application relates to the field of display technology, and more particularly relates to a backlight module and a display device.

BACKGROUND

The description provided in this section is intended for the mere purpose of providing background information related to the present application but doesn't necessarily constitute prior art. In recent years, with the development and maturity of Mini LED (Mini Light Emitting Diode) display technology, displays using Mini LED backlight (TV, MNT, NB, etc.) have gradually entered the households of mass users, and they have excellent display quality, such as high brightness, high color gamut, high contrast, etc., bringing users a new visual experience.

Due to the large number of lamp beads on the Mini LED light plate and the high heat generation, the heat dissipation of the light plate has become a major problem. If it is not handled properly, the LEDs will work at high temperature for a long time, which will greatly reduce the life of the LEDs. Nowadays, the heat dissipation design of the Mini LED backlight module light plate adopts a passive heat dissipation scheme: that is, the Mini LED light plate is attached to a metal back plate, and the metal back plate is used for heat dissipation. This solution has poor thermal uniformity and low heat dissipation efficiency. If the design current of the LEDs is high and the heat generation is large, it is likely to cause the LEDs to burn out if used for a long time. Therefore, how to evenly dissipate the heat of the Mini LED light plate for heat dissipation purposes has become an urgent problem to be solved.

SUMMARY

It is therefore a purpose of the present application to provide a backlight module and a display device that can actively conduct heat and have a good heat dissipation effect.

The present application discloses a backlight module, including a back plate, a light plate and a plurality of lamp beads. The light plate is arranged opposite to the back plate, and a plurality of the lamp beads are arranged on the side of the light plate away from the back plate. The back plate includes a back plate body, at least one sunken groove, and a thermally conductive adhesive. The back plate body is disposed opposite to and spaced apart from the light plate. The sunken groove is arranged on the side of the back plate body opposite to the light plate. The thermally conductive adhesive is arranged in the sunken groove. An air channel is arranged between the thermally conductive adhesive and the light plate. The back plate defines at least one trough communicating with the sunken groove, and two ends of the trough are respectively provided with an air inlet and an air outlet.

In some embodiments, the trough is provided in the back plate body. The air inlet and the air outlet are each a hole-like structure formed through the back plate body, and do not overlap the thermally conductive adhesive. The side of the thermally conductive adhesive facing the light plate forms a sawtooth structure, and the sawtooth structure includes a plurality of teeth arranged at intervals.

In some embodiments, all the air inlets on the back plate body are located on the same side of the back plate body, and all the air outlets on the back plate body are also located on the same side on the back plate body. The air inlets and the air outlets are respectively located on opposite sides of the back plate body.

In some embodiments, the ends of the teeth of the thermally conductive adhesive are in contact with the light plate, and the air channel is formed between the adjacent teeth and the light plate.

In some embodiments, when the backlight module is used, the distance between the air outlet and the ground is greater than the distance between the air inlet and the ground. The width of the sunken groove close to the air outlet is greater than the width of the sunken groove close to the air inlet, and/or, in the thermally conductive adhesive, the cross-sectional area of the air channel between the adjacent teeth near the air outlet is smaller than the cross-sectional area of the air channel between adjacent teeth adjacent to the air inlet.

In some embodiments, along the width direction of the sunken groove, the cross section of the sunken groove is a triangular structure.

In some embodiments, the sunken groove includes a plurality of sub-sunken grooves arranged in parallel, the trough includes a plurality of sub-troughs arranged in parallel, where the plurality of sub-sunken grooves and a plurality of the sub-troughs are arranged to perpendicularly intersect each other. Both ends of each of the sub-troughs are respectively provided with the air inlet and the air outlet.

In some embodiments, the cross-sectional area of the sub-trough close to the air inlet is greater than the cross-sectional area of the sub-trough close to the air outlet. The cross-sectional area of the sub-sunken groove is smaller than the cross-sectional area of the sub-trough close to the air inlet.

In some embodiments, along the air incoming direction, the diameter of the air inlet gradually decreases; along the air outgoing direction, the diameter of the air outlet gradually increases.

In some embodiments, the backlight module further includes a heat radiation layer, the heat radiation layer is disposed on the side of the light plate opposite to the back plate. The air channel is formed between the heat radiation layer and the thermally conductive adhesive.

In some embodiments, when the backlight module is used, the distance between the air outlet and the ground is greater than the distance between the air inlet and the ground, and the thickness of the heat radiation layer close to the air outlet is greater than the thickness of the heat radiation layer close to the air inlet.

In some embodiments, the trough is provided in the back plate body, the air inlet and the air outlet overlap the thermally conductive adhesive, and at the same time pass through the thermally conductive adhesive and the back plate body to form a hole-like structure. A plurality of vent holes penetrating the back plate body are arranged in the trough, and the plurality of vent holes do not overlap the thermally conductive adhesive.

The present application further discloses a display device, including a display panel and the above-mentioned backlight module. The display panel is arranged on one side of the backlight module, and the backlight module provides a backlight source for the display panel.

Compared with the solution of directly attaching the light plate to the metal back plate and using the metal back plate to dissipate heat, the back plate body of the present application is disposed opposite to and spaced apart from the light plate. A sunken groove is defined in the back plate body, and a thermally conductive adhesive is arranged in the sunken groove, and an air channel is arranged between the thermally conductive adhesive and the light plate. Furthermore, the back plate defines at least one trough that communicates with the sunken groove, and the two ends of the trough are respectively provided with an air inlet and an air outlet, so that an air storage space is formed between the back plate body and the light plate. As such, the heat on the light plate is first dissipated into the air storage space and mixed with the air to form a uniform hot air flow, and then through the active heat absorption function of the thermally conductive adhesive, the heat of the hot airflow is absorbed and then transferred to the side of the back plate to achieve the effect of active heat conduction. Moreover, an air channel can also be formed between the trough and the light plate. When the backlight module is in operation, the lamp beads light up to emit a large amount of heat and conduct it into the air storage space. The hot air is heated and rises, so that the air pressure in the air storage space becomes lower, and the air with a lower temperature enters the airflow passage from the air inlet, the air storage space, and the air channel between the thermally conductive adhesive and the light plate. As a result, the air in the backlight module can flow, so that the heat in the air storage space can be cyclically taken away, leading to a superior heat dissipation effect.

DETAILED DESCRIPTION OF EMBODIMENTS

Figure 1:
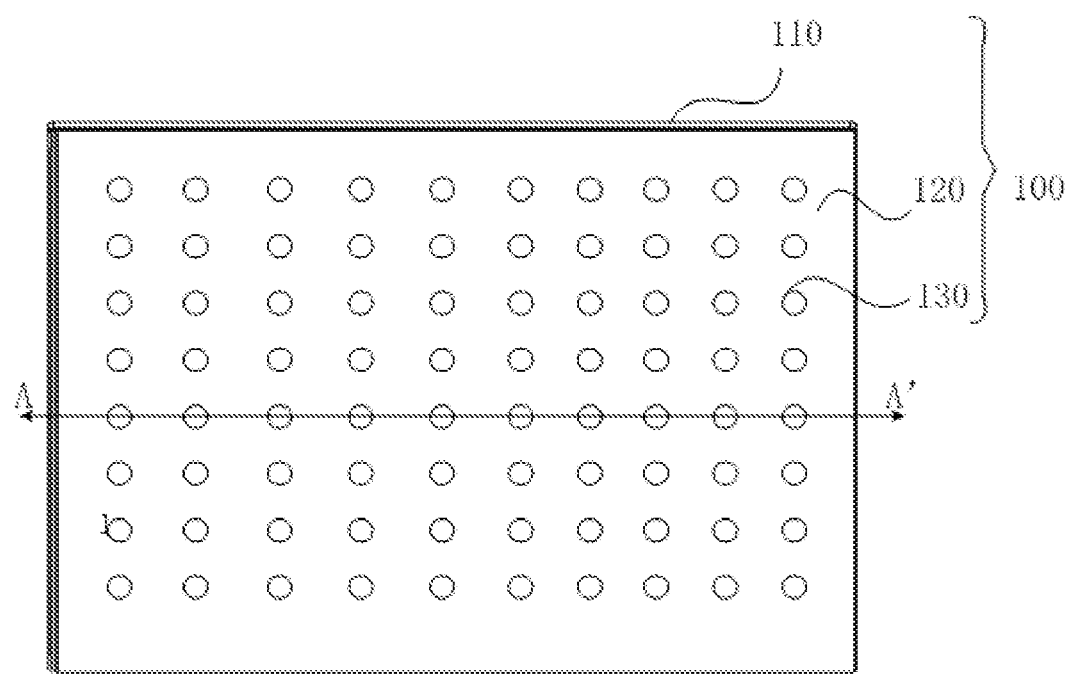
FIG. 1 is a schematic diagram of a backlight module of the present application.
Figure 2:
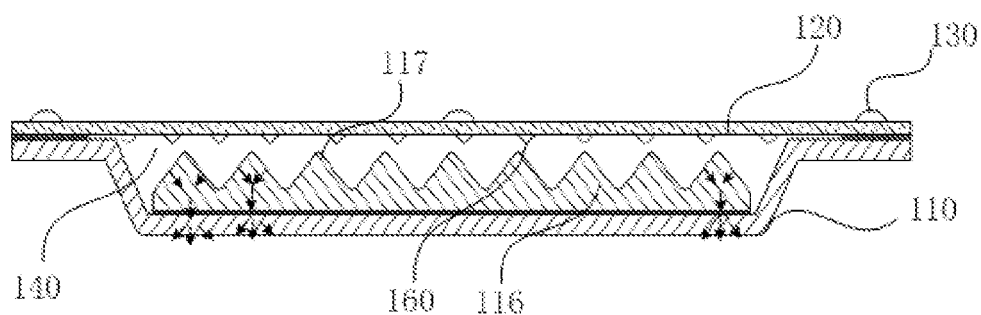
FIG. 2 is a schematic view of the cross-sectional structure of FIG. 1 along section line A-A'.

FIG. 1 is a schematic diagram of a backlight module of the present application. FIG. 2 is a schematic view of a cross-sectional structure of FIG. 1 along section line A-A'. As shown in FIGS. 1-2, the present application discloses a backlight module 100, including a back plate 110, a plurality of lamp beads 130, and a light plate 120. The light plate 120 is disposed opposite to the back plate 110. The plurality of lamp beads 130 are disposed on the side of the light plate 120 away from the back plate 110. The back plate 110 includes a back plate body 111, at least one sunken groove 112, and a thermally conductive adhesive 116. The back plate body 111 is disposed opposite to and spaced apart from the light plate 120. The sunken groove 112 is disposed on the side of the back plate body 111 opposite to the light plate 120. The thermally conductive adhesive 116 is disposed in the sunken groove 112. An air channel 140 is defined between the thermally conductive adhesive 116 and the light plate 120. The back plate 110 defines at least one trough 114 communicating with the sunken groove 112. Two ends of the trough 114 are respectively provided with an air inlet 160 and an air outlet 170.

Compared with the solution of directly attaching the light plate 120 to the metal back plate 110 in the related art and using the metal back plate 110 to dissipate heat, the back plate body 111 of the present application is disposed opposite to and spaced apart from the light plate 120. A sunken groove 112 is defined in the back plate body 111, and a thermally conductive adhesive 116 is arranged in the sunken groove 112, and an air channel 140 is arranged between the thermally conductive adhesive 116 and the light plate 120. Furthermore, the back plate 110 defines at least one trough 114 that communicates with the sunken groove 112, and the two ends of the trough 114 are respectively provided with an air inlet 160 and an air outlet 170, so that an air storage space is formed between the back plate body 111 and the light plate 120. As such, the heat on the light plate 120 is first dissipated into the air storage space and mixed with the air to form a uniform hot air flow, and then through the active heat absorption function of the thermally conductive adhesive 116, the heat of the hot airflow is absorbed and then transferred to the side of the back plate 110 to achieve the effect of active heat conduction. Moreover, an air channel can also be formed between the trough 114 and the light plate 120. When the backlight module 100 is in operation, the lamp beads 130 light up to emit a large amount of heat and conduct it into the air storage space. The hot air is heated and rises, so that the air pressure in the air storage space becomes lower, and the air with a lower temperature enters the airflow passage from the air inlet 160, the air storage space, and the air channel 140 between the thermally conductive adhesive 116 and the light plate 120. As a result, the air in the backlight module 100 can flow, so that the heat in the air storage space can be cyclically taken away, leading to a superior heat dissipation effect.

Figure 3:
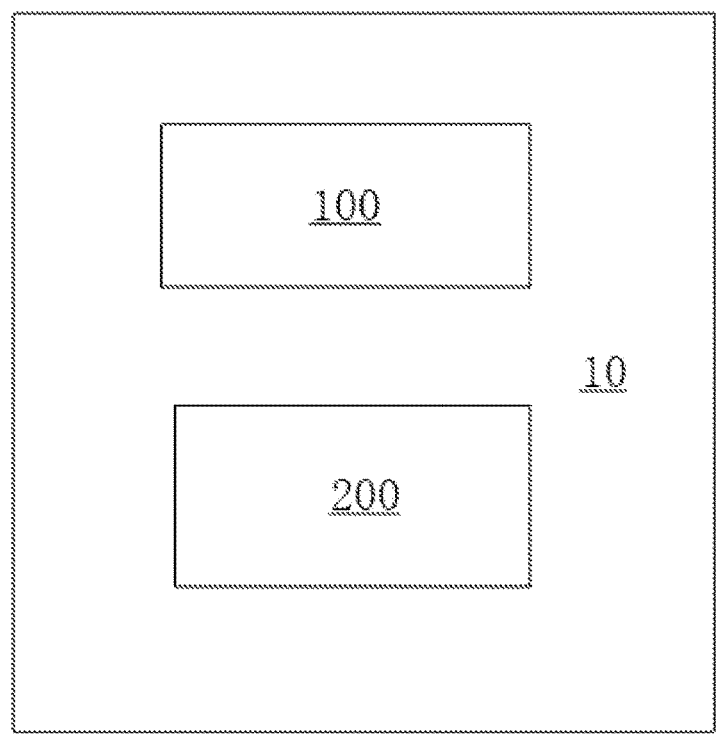
FIG. 3 is a schematic block diagram of a display device of the present application.

FIG. 3 is a schematic block diagram of a display device of the present application. As shown in FIG. 3, the present application further discloses a display device 10 including a display panel 200 and the above-mentioned backlight module 100. The display panel 200 is disposed on one side of the backlight module 100. The backlight module 100 provides a backlight source for the display panel 200. The display device 10 assembled in this way has an active heat conduction function, has a good heat dissipation effect, and can prolong the service life of the display device 10.

Hereinafter this application will be described in further detail with reference to the accompanying drawings and some optional embodiments.

Embodiment 1

Figure 4:
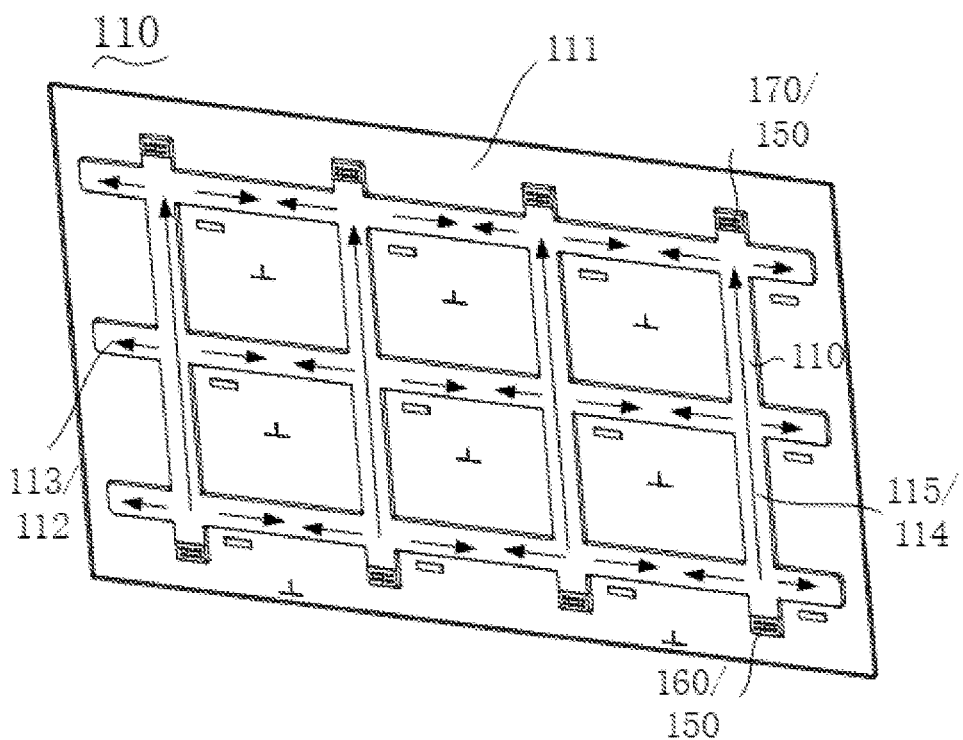
FIG. 4 is a schematic diagram of the overall structure of the back plate provided by a first embodiment of the present application.
Figure 5:
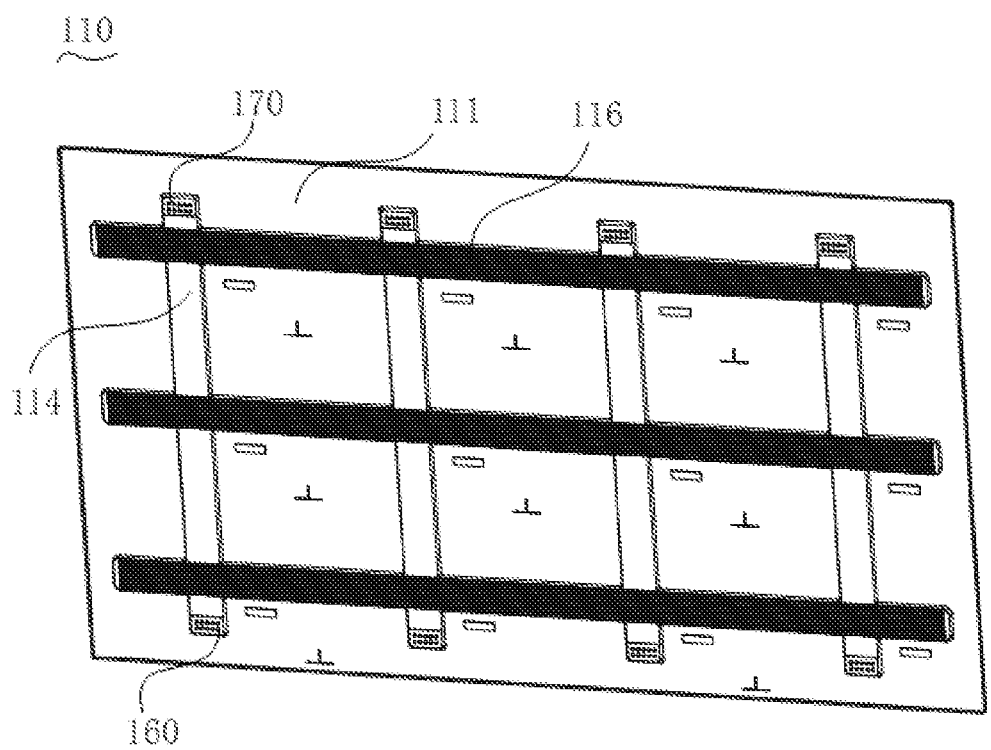
FIG. 5 is a schematic diagram of the back plate on which a thermally conductive adhesive is disposed according to the first embodiment of the present application.

FIG. 4 is a schematic diagram of the overall structure of the back plate provided by a first embodiment of the present application. FIG. 5 is a schematic diagram of the back plate 110 on which the thermally conductive adhesive 116 is arranged according to the first embodiment of the present application. As shown in FIGS. 4-5, it can be seen that the trough 114 is defined in the back plate body 111. The air inlet 160 and the air outlet 170 are each a hole-like structure 150 that goes through the back plate body 111. That is, the air inlet 160 and the air outlet 170 are each composed by a plurality of holes spaced apart from each other and do not overlap the thermally conductive adhesive 116. Compared with the use of a whole larger-sized air inlet 160 or an air outlet 170, since the total area communicating with the outside world is equivalent to that of a larger-sized air inlet or air outlet, this can ensure the normal flow rate of the air flow and increase the amount of air convection in the backlight module 100, and facilitate subsequent heat dissipation. Furthermore, since the area of the single air inlet 160 and the air outlet 170 is reduced, it is also beneficial to prevent the entry of dust. In addition, it can also prevent foreign matter from entering the backlight module 100 from the air inlet 160 and the air outlet 170.

Meanwhile, in this embodiment of the present application, all the air inlets 160 on the back plate body 111 are arranged on the same side of the back plate body 111, and all the air outlets 170 on the back plate body 111 are also arranged on the same side of the back plate body 111, so that the air inlets 160 and the air outlets 170 are located on two opposite sides of the back plate body 111, respectively. In this way, the outside air enters from one side of the back plate body 111 and exits from the other side, and the flow direction of the airflow is consistent and there will be no problem of turbulent airflow caused by conflicting air flows, and will not affect the flow rate of the airflow. It should be noted that, in the orientation shown in FIG. 4, the laterally parallel sides of the back plate body 111 are defined as the top side and the bottom side, respectively, and the same side here refers to the side adjacent to the bottom side or the side adjacent to the top side.

Because the heated air expands and rises, while the cooled air sinks, based on this principle, in the embodiments of the present application, the positions of the air inlet 160 and the air outlet 170 in the back plate body 111 are defined based on the conditions of the backlight module 100 and the display device 10 in the operating state. Specifically, a sky side T and a ground side B are defined on the back plate body 111 and are opposite to each other. The air inlet 160 is located on the ground side B of the back plate body 111, and the air outlet 170 is located on the sky side T of the back plate body 111. When the backlight module 100 and the display device 10 are in use, the sky side T is higher than the ground side B, that is, the position of the air outlet 170 is higher than the position of the air inlet 160. In other words, taking the monitor of a desktop computer as an example, the monitor includes a display screen and a base, and the display screen is installed on the base. When the display screen of the desktop computer is installed on the computer table, the side of the display screen closer to the base corresponds to the ground side of the backlight module, and the side of the display screen away from the base corresponds to the sky side of the backlight module.

After adopting such a design, the air in the air channel 140 and the trough 114 expands and rises after being heated by the light plate 120 and the back plate 110, and flows out from the air outlet 170. After this part of hot air flows upward, the air pressure in the area where this part of the hot air was originally located is reduced, and so the cold air from the outside enters the air channel 140 and the trough 114. This continuous process forms the flow of airflow, so that the hot air is continuously discharged toward the air outlet 170, and the cold air is continuously inflowed toward the air inlet 160, so as to continuously dissipate heat from the light plate 120 and the back plate 110.

Further, the present application can also design the air inlet 160 and the air outlet 170. The air inlet 160 and the air outlet 170 each can also be a large opening instead of a hole-like design. At this time, along the air incoming direction, the diameter of the intake port 160 gradually decreases. Along the air outgoing direction, the diameter of the air outlet 170 gradually increases. In this way, by designing the air inlet 160 to be wide on the outside and small on the inside, the pressure difference is used to guide the cold air from the outside to the inside. By designing the air outlet 170 to be small inside and large outside, air expansion is used to accelerate and guide air to be discharged to the outside, thereby speeding up the flow of air, which is conducive to better heat dissipation.

Specifically, both the air inlet 160 and the air outlet 170 can be made into a horn shape, and the side wall of the air inlet 160 can be further inclined at 45 degrees, and the larger the outer diameter of the air inlet 160, the better, which is beneficial to increase the pressure difference and accelerate the entry of cold air into the trough 114. Of course, when the air outlet 170 and the air inlet 160 are hole-shaped structures, the air inlet 160 and the air outlet 170 can also be made into hole-shaped structures with regular shapes, that is, the diameters of the inner and outer sides are equal. Alternatively or additionally, it is also possible to make only the air inlet 160 or the air outlet 170 into a hole-like structure with a regular shape.

In addition, when the air outlet 170 and the air inlet 160 are hole-like structures, the air inlet 160 is composed of a plurality of air inlet holes arranged in an array, where the air inlet holes may be round holes, square holes or special-shaped holes. The plurality of air inlet holes may be arranged in a circular array, or may be arranged in a square array. Similarly, the air outlet 170 can also be designed according to with the above-mentioned air inlet 160, so that the air outlet 170 is composed of a plurality of air outlet holes arranged in an array. The sizes of the air inlet holes and the air outlet holes can be designed depending on the specific conditions to achieve better dust prevention and ensure the effect of smooth flow of air in and out.

For better air flow and more comprehensive heat dissipation, the number of sunken grooves and troughs can also be designed. Specifically, as shown in FIG. 4, the sunken groove 112 includes a plurality of sub-sunken grooves 113 arranged in parallel, and the trough 114 includes a plurality of sub-troughs 115 arranged in parallel. The plurality of sub-sunken grooves 113 and a plurality of the sub-troughs 114 vertically intersect each other. Both ends of each of the sub-troughs 114 are respectively provided with the air inlet 160 and the air outlet 170. That is, the plurality of air channels 140 are arranged to intersect the plurality of sub-troughs 115. When the backlight module 100 is in operation, the distance between the air outlet 170 and the ground is greater than the distance between the air inlet 160 and the ground. Since there is a gap between the thermally conductive adhesive 116 in the sunken groove 112 and the light plate 120 to form the air channel 140, the air flows into the air inlet 160 to form an air flow and flows in the direction of the air outlet 170. When reaching each intersection of the sub-sunken groove 113 and the sub-trough 115, the flow will be divided (specifically, see the direction indicated by the arrow in FIG. 4). A part of the air flow will lead to the surface of the thermally conductive adhesive 116 on both sides, and a part will go straight up to the air outlet 170 along the air channel 140. The airflow in the air channel 140 can pass through the gap, and the hot air in the air channel 140 can be taken away by the way. The airflow to both sides will flow along the air channels 140 on the surface of the thermally conductive adhesive 116, and take away part of the temperature of the surface of the thermally conductive adhesive 116, thereby forming a state of airflow in the backlight module 100. The air inlet 160 supplements the cold air flow, and the hot air flows out from the air outlet 170. In this way, the flow of hot air in the backlight module 100 is accelerated, thereby reducing the temperature of the entire light plate 120, so that the temperature of the entire light plate 120 is uniformly released.

In addition, this embodiment may further design each sub-trough. That is, the cross-sectional area of the sub-trough 115 close to the air inlet 160 is greater than the cross-sectional area of the sub-trough 115 close to the air outlet 170. Specifically, a gradual transition method may be adopted, so that the cross-sectional area of the sub-trough 115 gradually decreases in the direction from the air inlet 160 to the air outlet 170.

After each sub-trough 115 adopts such a design, more outside cold air enters from the air inlet 160. In the process of the airflow gradually flowing and approaching the air outlet 170, the cross-sectional area of the sub-trough 115 gradually becomes smaller, and at the same time, more air needs to flow out, resulting in an accelerated flow rate of the airflow. Therefore, the air exchange between the inside and the outside of the backlight module 100 is accelerated, so that the cooling of the back plate 110 and the light plate 120 can be accelerated.

In addition, the cross-sectional area of each sub-sunken groove 113 can be set smaller than the cross-sectional area of the sub-trough 115 close to the air inlet 160, so that a better part of the air entering the sub-troughs 115 will not be taken by the sub-troughs 113, resulting in a slower flow rate of the air flow.

Figure 6:
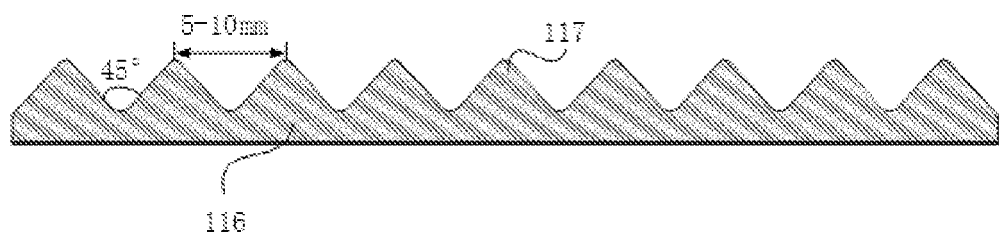
FIG. 6 is a schematic diagram of the thermally conductive adhesive provided by the first embodiment of the present application.

FIG. 6 is a schematic diagram of a thermally conductive adhesive provided by a first embodiment of the present application. As shown in FIG. 6, the top of the thermally conductive adhesive 116 facing the light plate 120 is a sawtooth structure formed by a plurality of teeth 117 arranged at intervals.

As the air rises in the back plate 110, the air will be continuously heated and expanded. When passing by the position of the thermally conductive adhesive 116, a part of the air will expand and go to both sides in the direction in which the thermally conductive adhesive 116 extends, forming convection. At this time, after the upward air is discharged from the air outlet 170, the pressure near the air outlet 170 is relatively small, which will guide the air below to flow upward, and so can also take away part of the temperature of the surface of the thermally conductive adhesive 116, thereby reducing the temperature of the thermally conductive adhesive 116. As such, the thermal conductive adhesive 116 absorbs more heat and transmits it to the back plate 110, resulting in a superior thermal conduction effect.

Furthermore, the sawtooth structure of the thermally conductive adhesive 116 can also increase the thermally conductive area. The thermally conductive adhesive 116 of the sawtooth structure forms an angle space between each tooth 117 by two sides of the tooth 117. When the airflow flows over the surface of the thermally conductive adhesive 116, the area of the hot airflow that the surface of the thermally conductive adhesive 116 contacts increases, so that the thermal conductivity is enhanced. Moreover, when the airflow flows to the intersection of the air channel 140 and the thermally conductive adhesive 116, it can also pass between the included angles to take away more heat from the surface of the thermally conductive adhesive 116 and help the thermally conductive adhesive 116 to cool down.

The included angle may be 45°, and the interval between the top surfaces of every two teeth 117 may be 5-10 mm, so the arrangement is relatively uniform. Of course, it can also be designed depending on the size of the specific backlight module 100. The thermally conductive adhesive 116 may be thermally conductive silicone. Of course, other thermally conductive materials can also be used.

In addition, the thermally conductive adhesive 116 is affixed to the entire sunken groove 112, so that the area of the thermally conductive adhesive 116 is larger, the overall thermal conductivity is better, and the heat dissipation of the light plate 120 is faster. Of course, the thermally conductive adhesive 116 may also be partially disposed in the sunken groove 112, which may be set depending on the actual situation.

Furthermore, as shown in FIGS. 4 to 5, the troughs 114 and the sunken grooves 112 are arranged perpendicularly, and the troughs 114 are straight, so that the air flow channels formed in cooperation with the light plate 120 are relatively smooth. The air generally rises upward, and because when the light plate 120 heats up it will heat the incoming air, the air expands faster. By this arrangement, the hot airflow is faster in the process of rising, and it is not easy to cause congestion. Therefore, it is not easy to increase the temperature inside the backlight module 100 due to the presence of the hot air flow. Of course, the troughs 114 and the sunken grooves 112 may not be perpendicularly arranged, and the troughs 114 may be of other shapes. In this case, the entire air channel 140 may be set relatively unobstructed.

Figure 7:
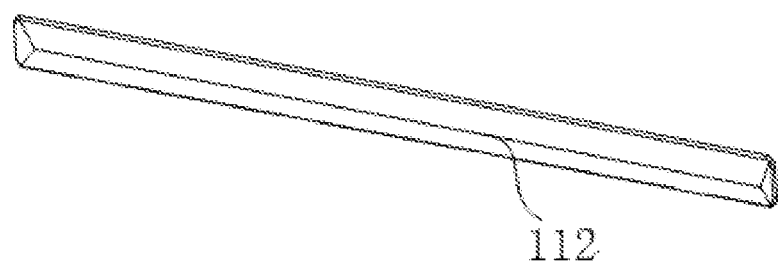
FIG. 7 is a schematic diagram of a sunken groove provided by the first embodiment of the present application.
Figure 8:
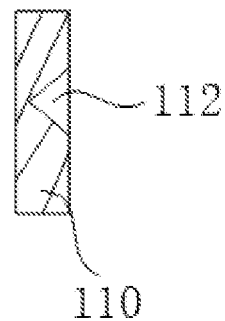
FIG. 8 is a schematic cross-sectional diagram of the sunken groove provided on the back plate according to the first embodiment of the present application.

Further, FIG. 7 is a schematic view of the structure of the sunken groove provided by the first embodiment of the present application, and FIG. 8 is a schematic view of the cross-sectional structure of the sunken groove in the back plate provided by the first embodiment of the present application. As shown in FIGS. 7-8, it can be seen that along the width direction of the sunken groove 112, the cross section of the sunken groove 112 is a triangular structure. At this time, when the thermally conductive adhesive 116 is laid, the contact area between the thermally conductive adhesive 116 and the back plate body 111 is relatively increased, and the thermally conductive adhesive 116 is tightly fitted after contacting the back plate body 111. On the one hand, the bonding stability of the thermally conductive adhesive 116 is improved. On the other hand, the heat conduction area is larger, and the heat is gradually guided to both sides on the back plate body 111, so that the heat is conducted more uniformly. Of course, the cross-section of the sunken groove 112 may also be in other shapes, such as rectangle, arc, etc. When the cross-section of the sunken groove 112 is arc-shaped, the contact area between the thermally conductive adhesive 116 and the back plate 110 is relatively large, and the heat can also be conducted to the back plate 110 and radially to the outside of the back plate 110, so that the heat conduction effect is relatively uniform.

Referring to FIG. 2, the backlight module 100 further includes a heat radiation layer 180. The heat radiation layer 180 is disposed on the side of the light plate 120 opposite to the back plate 110. The air channel 140 is formed between the heat radiation layer 180 and the thermally conductive adhesive 116.

Since the heat radiation layer 180 has the function of actively radiating heat, after being arranged in this way, the heat radiation layer 180 can actively guide the heat of the corresponding hot air flow to the direction of the thermal conductive adhesive 116, so that the heat is more concentrated and absorbed by the thermal conductive adhesive 116 and guided to the back plate 110, thereby reducing the accumulation of heat on the light plate 120. The heat radiation layer 180 may be graphitic carbon, which can be laid by printing.

Of course, the heat radiation layer 180 may also be other heat radiation materials. The distance between the heat radiation layer 180 and the thermally conductive adhesive 116 may be 0.3-0.5 mm. Such a distance can ensure that the hot air flow can pass smoothly, and at the same time, it can also ensure that the temperature of the surface of the thermally conductive adhesive 116 is also taken away.

The thickness of the heat radiation layer 180 can be uniformly laid, so that the heat radiation layer 180 can conduct the heat of the hot air flow to the entire back plate 110 relatively uniformly at every position.

Because more hot air is gathered near the air outlet 170 (because the hot air flows upward, taking the orientation shown in FIG. 4 as an example, more heat will be gathered at the upper part of the light plate 120 at this time, where the more heat here includes not only the side of the light plate 120 adjacent to the back plate body 111, but also the side of the light plate 120 adjacent to the lamp beads 130), the heat at this position is relatively high, so the thickness of the heat radiation layer 180 at a position close to the air outlet 170 can be set to be larger than the thickness of the heat radiation layer 180 near the air inlet 160. This can speed up the heat dissipation of the heated airflow at that location, thereby speeding up the heat dissipation.

As shown in FIG. 4 and FIG. 5, in this embodiment, the air inlet 160 and the air outlet 170 are relatively far away from each other, and are each located at an end away from the intersection of the respective air channel 140 and the thermally conductive adhesive 116. At this time, after the air enters from the air inlet 160, the diversion occurs after a certain distance, so that when the air begins to enter the intersection at the bottom, more air will be split. In this way, more hot air at the bottom is driven, and layer by layer, and when it reaches the top, the amount of hot air that can be taken away is relatively large, which is conducive to the internal air circulation and heat conduction, thereby improving the heat dissipation effect.

Moreover, both the sunken grooves 112 and the troughs 114 are provided in a plurality of lines. In this way, a plurality of air channels are formed between the plurality of troughs 114 and the light plate 120, so that cold air can be introduced from multiple positions, so that the amount of the incoming cold air is large and fills the entire backlight module 100 faster, the flow of hot air is accelerated. The thermal conductive adhesive 116 is evenly distributed on the corresponding positions of the plurality of sunken grooves 113, which can perform heat conduction on the hot air flow in the entire air storage space, thus further increasing the flow channels of the air flow. After the cold air is introduced, it can perform convection movements in different directions, so that the air flow can flow faster, thereby accelerating the heat of the hot air to be uniformly dispersed and mixed. After flowing, it is discharged from the plurality of air outlets 170 to speed up the heat dissipation speed of the light plate 120.

Since the air introduced from the air inlet 160 is continuously heated during the rising process, the temperature of the air increases, the higher the air is located, the higher the temperature of the air is. Therefore, the width of the sunken groove 112 near the air outlet 170 can be set to be larger than the width of the sunken groove 112 near the air inlet 160. In this way, at the position close to the air outlet 170, the area of the thermally conductive adhesive 116 is wider and larger, and the heat absorption effect on the hot air flow is relatively strong. Therefore, when the heated air rises to this position, it can absorb more heat, so that the temperature of the hot air gathered at this position is relatively lowered, and the overall temperature is adjusted to prevent the temperature of the inner part from being too high and affecting the light plate 120. In addition, the cross-sectional area of the air channel 140 between the adjacent teeth 117 near the air outlet 170 in the thermally conductive adhesive 116 may be set smaller than the cross-sectional area of the air channel 140 between the adjacent teeth 117 near the air inlet 160 in the thermally conductive adhesive 116. In this way, the serrations of the thermally conductive adhesive 116 near the air outlet 170 are fine and dense, and the angle between the two teeth 117 is relatively small, so that the hot air can be divided more finely when passing through. Moreover, more air can contact the surface of the thermally conductive adhesive 116, thereby taking away part of the temperature of the surface of the thermally conductive adhesive 116, thereby reducing the internal air temperature. Setting the width of the sunken groove 112 close to the air outlet 170 to be relatively wider and setting the thermally conductive adhesive 116 close to the air outlet 170 to have a fine and dense sawtooth shape can be carried out separately, or the two can be combined. Specifically, the settings may be selected according to the shape and size of the backlight module to achieve better heat conduction and heat dissipation effects.

Of course, the thermally conductive adhesive 116 may also be provided in the trough 114. Specifically, the thickness of the thermally conductive adhesive 116 laid may be determined based on the depth of the trough 114. In this way, when the hot air passes through the air channel 140, part of the heat of the hot air can be absorbed by the thermally conductive adhesive 116 in the trough 114 and guided to the back plate 110, and then emitted by the back plate 110. On the one hand, the overall temperature of the hot air is reduced, so that the hot air rises slowly and expands slowly, so as to avoid a large impact on the air outlet 170. On the other hand, it is also possible to actively absorb the temperature on the side of the light plate 120 and conduct the heat to the back plate 110, thereby reducing the temperature on the side of the light plate 120.

In addition, the thickness of the thermally conductive adhesive 116 in the same sunken groove 112 can also be set depending on the situation. Since the hot air flow is generally located closer to the air outlet 170, the thickness of the thermally conductive adhesive 116 in the sunken groove 112 near the air outlet 170 can be designed differently. In particular, the thickness of the thermally conductive adhesive 116 in the sunken groove 112 gradually increases along the width direction of the sunken groove 112, so that the thermally conductive adhesive 116 there can gradually increase the heat absorption of the hot air flow, so as to improve the heat absorption capability of the thermally conductive adhesive 116 near the air outlet 170, and after cooperating with the thermally conductive adhesive 116 in other positions, the effect of more uniform heat conduction and heat dissipation can be achieved. Of course, starting from the first sunken groove 112 at the bottom of the back plate 110, the thickness of the thermally conductive adhesive 116 may be gradually increased along the direction of the air channel 140 to be laid. That is, the thickness of the thermal conductive adhesive 116 in the sunken groove 112 closest to the air inlet 160 is the thinnest, and the thickness of the thermal conductive adhesive 116 in the sunken groove 112 closest to the air outlet 170 is the thickest. In this way, after the air enters, under the influence of the temperature of the light plate 120, the temperature of the air is in a state of gradually rising. Therefore, with the design of the thermally conductive adhesive 116, the heat of the air can be gradually absorbed from low to high, and the temperature inside the backlight module 100 can be balanced, so as to prevent the light plate 120 from being damaged due to excessively high temperature.

Embodiment 2

Figure 9:
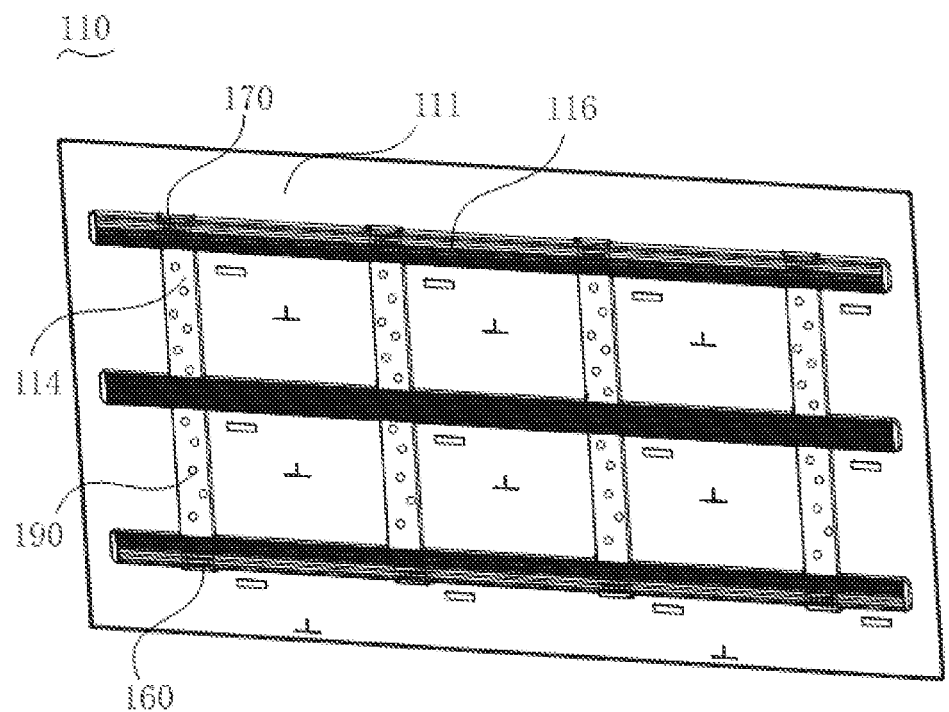
FIG. 9 is a schematic diagram of a back plate on which the thermally conductive adhesive is disposed according to a second embodiment of the present application.

FIG. 9 is a schematic diagram of a back plate on which the thermally conductive adhesive is disposed according to a second embodiment of the present application. As shown in FIG. 9, the difference between this embodiment and the first embodiment is that the trough 114 is provided in the back plate body 111, and the air inlet 160 and the air outlet 170 each overlap the thermally conductive adhesive 116, and simultaneously pass through the thermally conductive adhesive 116 and the back plate body 111 to form a hole-like structure 150. A plurality of vent holes penetrating the back plate body 111 are provided in the trough 114, and the plurality of vent holes do not overlap the thermally conductive adhesive 116.

Since the temperature of the thermally conductive adhesive 116 is relatively high after absorbing heat, after this setting, when the cold air enters from the air inlet 160, part of the heat on the thermally conductive adhesive 116 is directly taken away. At this time, the temperature of the thermally conductive adhesive 116 has a larger temperature drop, so that the heat at the light plate 120 can be absorbed more subsequently. The thermally conductive adhesive 116 at the air outlet 170 can also absorb the heat of the hot air when the hot air is concentrated and dissipated, so that part of the heat of the collected hot air flow is led out and dissipated by the back plate 110, so that the heat is not all concentrated and gushing from the air outlet 170, thereby reducing the expansion and impact force of the hot air flow on the air outlet 170. In addition, vent holes penetrating the back plate body 111 is provided at positions in the trough 114 that do not overlap the thermally conductive adhesive 116, and so part of the hot air can also be directly discharged from the back plate body 111 through the vent holes during the rising process, thereby reducing the amount of hot air flow in the backlight module 100, thereby reducing the air temperature in the backlight module 100, and achieving the desired heat dissipation effect.

Embodiment 3

Figure 10:
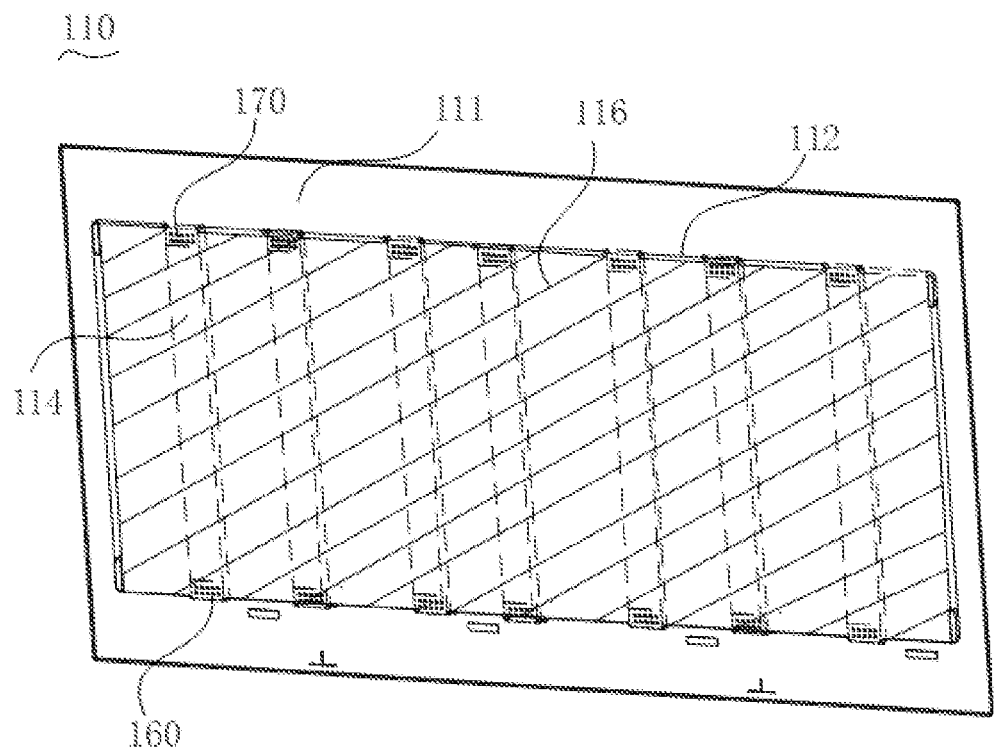
FIG. 10 is a schematic diagram of a back plate on which the thermally conductive adhesive is disposed according to a third embodiment of the present application.

FIG. 10 is a schematic diagram of a back plate provided by the third embodiment of the present application on which a thermally conductive adhesive is disposed. As shown in FIG. 10, the difference between this embodiment and the first embodiment is that the middle part of the back plate body 111 is recessed in the direction away from the light plate 120 to form the sunken groove 112. That is, a large sunken groove 112 is formed on the back plate body 111 for laying the thermally conductive adhesive 116 on the whole, so that the overall area for laying and pasting the thermally conductive adhesive 116 is large, and the area corresponding to the thermally conductive adhesive 116 and the light plate 120 is also large, so that the direct heat conduction effect on the light plate 120 is stronger and more concentrated.

Moreover, the entire surface is covered with thermally conductive adhesive 116, so that during the process of hot air flowing inside the air storage space, no matter where the hot air flows, heat can be absorbed by the thermally conductive adhesive 116 and directed to the side of the back plate 110, thereby reducing the temperature inside the air storage space. The trough 114 is disposed in the thermally conductive adhesive 116, and the air outlet 170 and the air inlet 160 are both hole-like structures 150 formed passing through the thermally conductive adhesive 116 and the back plate body 111. The air channel 140 is formed by digging a trough in the thermal conductive adhesive 116 and the back plate 110, and the cold air is introduced through the air inlet 160, and on the one hand, the hot air at the bottom layer is directly taken away when entering. In the process of rising through the air channel 140, the temperature of the thermally conductive adhesive 116 corresponding to the air channel is gradually absorbed, and part of the heat of the thermally conductive adhesive that has absorbed the heat from the light plate side is taken away by the air channel, thereby reducing the temperature of the thermally conductive adhesive, so that the thermal paste will continue to work. The air flow from the air outlet 170 can also drive the hot air flow between the thermally conductive adhesive 116 and the light plate 120 to rise upwards and then go out to the air outlet 170, which can also promote the flow of the hot air flow between the thermal conductive adhesive 116 and the light plate 120, so as to achieve heat radiation. In this case, as shown in FIG. 9, the troughs of this embodiment can be set more densely, so as to better dissipate the heat of the entire thermal conductive adhesive and better drive the flow of hot air in the air storage space, so as to achieve better cooling effect.

Embodiment 4

Figure 11:
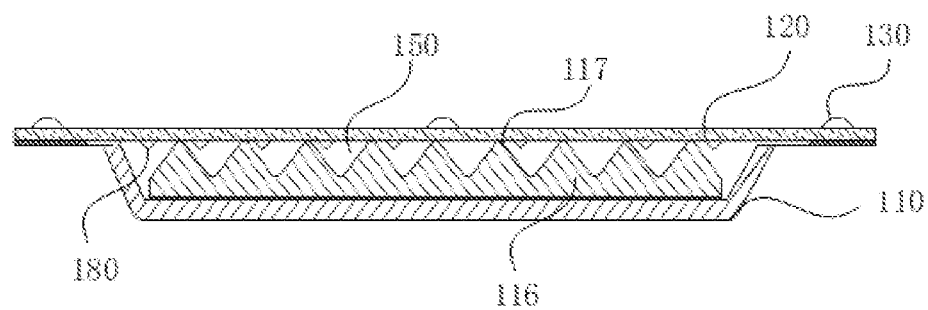
FIG. 11 is a schematic cross-sectional diagram of a backlight module provided by a fourth embodiment of the present application.

FIG. 11 is a schematic cross-sectional diagram of a backlight module provided by a fourth embodiment of the present application. As shown in FIG. 11, the difference between this embodiment and the first, second and third embodiments is that the ends of the teeth 117 of the thermally conductive adhesive 116 are in contact with the light plate 120 and the air channel 140 is formed between the adjacent teeth 117 and the light plate 120.

Since the display device 10 may shake during use, a squeezing effect may be formed on the backlight module 100. With this design, the ends of the teeth 117 of the thermally conductive adhesive 116 can be used to abut against the light plate 120 to play a shock absorbing role. Moreover, since the thermally conductive adhesive 116 has a sawtooth structure, and the end faces of the ends of the teeth 117 are in an arc shape, the contact area with the light plate 120 is large. Stress can be dissipated even when squeezed by gravity. In addition, the thermally conductive adhesive 116 of each tooth 117 is separated and abutted with the light plate 120 one by one, which can also play a role in dispersing and balancing the pressing gravity, so as to avoid damage to the light plate 120 when the pressing gravity is too large.

The size of each of the teeth 117 of the thermally conductive adhesive 116 and the curvature of the end faces of the teeth 117 can be set depending on the volume of the display device 10 to achieve better shock absorption effect.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
   a back plate;
   a light plate, disposed opposite to the back plate;
   a plurality of lamp beads, arranged on a side of the light plate facing away from the back plate;
   wherein the back plate comprises a back plate body disposed opposite to and spaced apart from the light plate, at least one sunken groove disposed in a side of the back plate body opposite to the light plate, and a thermally conductive adhesive disposed in the at least one sunken groove; wherein an air channel is formed between the thermally conductive adhesive and the light plate;
   wherein the back plate further comprises at least one trough connected with the at least one sunken groove, and two ends of each of the at least one trough respectively define an air inlet and an air outlet;
   wherein the at least one trough is defined in the back plate body; wherein the air inlet and the air outlet are each a hole-shaped structure running through the back plate body, and do not overlap the thermally conductive adhesive; wherein a side of the thermally conductive adhesive facing the light plate forms a sawtooth structure, the sawtooth structure comprising a plurality of teeth arranged at intervals;
   wherein when the backlight module is in use, a distance from the air outlet to a ground is greater than a distance from the air inlet to the ground; and wherein at least one selected from the group consisting of the following two options are used:
   the first option being one in which a width of a sunken groove comparatively nearer to the air outlet is greater than a width of another sunken groove comparatively nearer to the air inlet; and
   the second option being one in which in the thermally conductive adhesive, a cross-sectional area of an air channel between two adjacent teeth comparatively nearer to the air outlet is smaller than a cross-sectional area of another air channel between two adjacent teeth comparatively nearer to the air inlet.

2. The backlight module as recited in claim 1, wherein ends of each of the plurality of teeth of the thermally conductive adhesive are in contact with the light plate, and the air channel is formed between every two adjacent teeth and the light plate.

3. The backlight module as recited in claim 1, wherein along a width of the at least one sunken groove, a cross section of the at least one sunken groove is a triangular structure.

4. The backlight module as recited in claim 1, wherein the at least one sunken groove comprises a plurality of sub-sunken grooves disposed in parallel, and the at least one trough comprises a plurality of sub-troughs disposed in parallel; wherein the plurality of sub-sunken grooves are disposed perpendicular to the plurality of sub-troughs; wherein both ends of each of the plurality of sub-troughs respectively define the air inlet and the air outlet.

5. The backlight module as recited in claim 1, further comprising a heat radiation layer disposed on a side of the light plate opposite to the back plate, and wherein the air channel is formed between the heat radiation layer and the thermally conductive adhesive.

6. The backlight module as recited in claim 5, wherein when the backlight module is in use, a distance from the air outlet to a ground is greater than a distance from the air inlet to the ground, and wherein a thickness of a portion of the heat radiation layer comparatively nearer to the air outlet is greater than a thickness of another portion of the heat radiation layer comparatively nearer to the air inlet.

7. The backlight module as recited in claim 1,
   wherein a plurality of vent holes running through the back plate body are defined in the trough, and do not overlap the thermally conductive adhesive.

8. The backlight module as recited in claim 1, wherein a cross-sectional area of a portion of each of the at least one trough comparatively nearer to the air inlet is greater than a cross-sectional area of another portion of the trough comparatively nearer to the air outlet, and wherein the cross-section area of the trough decreases along an air outgoing direction.

9. The backlight module as recited in claim 1, wherein the air inlet and the air outlet are both trumpet-shaped, and each side wall of the air inlet is inclined at 45 degrees.

10. The backlight module as recited in claim 1, wherein the thermally conductive adhesive is further disposed in the at least one trough.

11. The backlight module as recited in claim 1, wherein an included angle is formed by two sides of each tooth of the thermally conductive adhesive, and wherein the included angle is 45°, and an interval between top surfaces of every two teeth lies in the range of 5-10 mm.

12. A backlight module, comprising a back plate, a light plate, and a plurality of lamp beads; wherein the light plate is arranged opposite to the back plate, and the plurality of lamp beads are arranged on a side of the light plate facing away from the back plate; wherein the back plate comprises a back plate body, at least one sunken groove, and a thermally conductive adhesive; the back plate body is disposed opposite to and spaced apart from the light plate; the at least one sunken groove is disposed in a side of the back plate body opposite to the light plate; the thermally conductive adhesive is disposed in the at least one sunken groove; and an air channel is arranged between the thermally conductive adhesive and the light plate;
   wherein the back plate further comprises at least one trough connected with the at least one sunken groove, and two ends of the at least one trough respectively define an air inlet and an air outlet;
wherein the at least one trough is defined in the back plate body; the air inlet and the air outlet are each a hole-like structure running through the back plate body, and do not overlap the thermally conductive adhesive; wherein a side of the thermally conductive adhesive facing the light plate forms a sawtooth structure, which comprises a plurality of teeth arranged at intervals; wherein ends of each of the plurality of teeth of the thermally conductive adhesive are in contact with the light plate, and the air channel is formed between every two adjacent teeth and the light plate; and
wherein a distance from the air outlet to a ground is greater than a distance from the air inlet to the ground; wherein a width of a sunken groove comparatively nearer to the air outlet is greater than a width of another sunken groove comparatively nearer to the air inlet; and in the thermally conductive adhesive, a cross-sectional area of an air channel between two adjacent teeth comparatively nearer to the air outlet is smaller than a cross-sectional area of another air channel between two adjacent teeth comparatively nearer to the air inlet.

13. A display device comprising a display panel and a backlight module, wherein the backlight module comprises a back plate, a light plate, and a plurality of lamp beads; wherein the light plate is arranged opposite to the back plate, and the plurality of the lamp beads are disposed on a side of the light plate facing away from the back plate; the back plate comprises a back plate body, at least one sunken groove, and a thermally conductive adhesive; wherein the back plate body is disposed opposite to and spaced apart from the light plate; the at least one sunken groove is defined in the side of the back plate body opposite to the light plate; the thermally conductive adhesive is disposed in the sunken groove; an air channel is formed between the thermally conductive adhesive and the light plate; wherein the back plate further defines at least one trough connected with the sunken groove, and wherein two ends of each of the at least one trough respectively define an air inlet and an air outlet;
wherein the at least one trough is defined in the back plate body; wherein the air inlet and the air outlet are each a hole-shaped structure running through the back plate body, and do not overlap the thermally conductive adhesive; wherein a side of the thermally conductive adhesive facing the light plate forms a sawtooth structure, the sawtooth structure comprising a plurality of teeth arranged at intervals;
wherein when the backlight module is in use, a distance from the air outlet to a ground is greater than a distance from the air inlet to the ground; and wherein at least one selected from the group consisting of the following two options are used:
the first option being one in which a width of a sunken groove comparatively nearer to the air outlet is greater than a width of another sunken groove comparatively nearer to the air inlet; and
the second option being one in which in the thermally conductive adhesive, a cross-sectional area of an air channel between two adjacent teeth comparatively nearer to the air outlet is smaller than a cross-sectional area of another air channel between two adjacent teeth comparatively nearer to the air inlet.

* * * * *